(12) United States Patent
Hsu

(10) Patent No.: US 6,933,702 B2
(45) Date of Patent: Aug. 23, 2005

(54) CONTROL METHOD AND SYSTEM FOR MOTOR

(75) Inventor: Chin-Yuan Hsu, Feng-Shan (TW)

(73) Assignee: National Kaohsiung University of Applied Sciences (TW)

( * ) Notice: Subject to any disclaimer, the term of this patent is extended or adjusted under 35 U.S.C. 154(b) by 0 days.

(21) Appl. No.: 10/684,540

(22) Filed: Oct. 14, 2003

(65) Prior Publication Data

US 2005/0077864 A1 Apr. 14, 2005

(30) Foreign Application Priority Data

Oct. 15, 2002 (TW) ........................................ 91123765 A

(51) Int. Cl.$^7$ ................................................ H02P 7/63
(52) U.S. Cl. ........................ 318/804; 318/801; 318/500; 318/609; 388/907.5
(58) Field of Search ................................. 318/432, 433, 318/459, 500, 600, 601, 609, 610, 138.254, 439, 720–724, 798–804; 388/907.5

(56) References Cited

U.S. PATENT DOCUMENTS

| | | | | |
|---|---|---|---|---|
| 5,936,378 A | * | 8/1999 | Iijima et al. | ................. 318/807 |
| 6,700,343 B2 | * | 3/2004 | Masaki et al. | ............... 318/434 |
| 6,707,265 B2 | * | 3/2004 | Imai et al. | ................... 318/254 |
| 6,771,039 B2 | * | 8/2004 | Sakurai et al. | .............. 318/722 |
| 6,812,659 B2 | * | 11/2004 | Imai et al. | ................... 318/254 |
| 6,812,660 B2 | * | 11/2004 | Takahashi et al. | ........... 318/254 |

\* cited by examiner

*Primary Examiner*—Bentsu Ro
(74) *Attorney, Agent, or Firm*—Ladas & Parry LLP

(57) ABSTRACT

The invention relates to a control method and a control system for a motor. The control method and the control system of the invention transfer the motor dynamic equations of the synchronous d-q frame into a motor parameter (for example, the leakage inductance) and the equivalent counter electromotive force. Then the required control signals for the motor current control can be obtained. The control method of the invention not only preserves the merit of constant switching frequency of the convention PI-PWM control system, but also can eliminate the motor current phase-lag problem of the invention PI-PWM control system. Also, the control method of the invention will have the following characteristics and economic advantages such as high accuracy, fast response, low cost and robustness, etc.

16 Claims, 10 Drawing Sheets

CONTROL METHOD AND SYSTEM FOR MOTOR

BACKGROUND OF THE INVENTION

1. Field of the Invention

The present invention relates to a control method and system for a motor, more particularly, to a control method and system using a micro-programming & memory controller for a motor.

2. Description of the Related Art

FIG. 1 shows a conventional PI-PWM (Proportion Integration-Pulse Width Modulation) current control system 11 for a motor 10. The conventional PI-PWM current control system 11 comprises: a first difference operator 12, a PI controller 14, a second difference operator 15, a PWM comparator 16 and an inverter 18. The control system 11 receives three phase reference currents 20 to the first difference operator 12, and detects three phase actual currents 22 from a motor 10. The first difference operator 12 calculates three phase difference currents between the three phase reference currents 20 and three phase actual currents 22.

The three phase difference currents are amplified by the PI controller 14 to obtain three phase control voltages. The second difference operator 15 calculates difference voltages between the three phase control voltages and three phase triangle-wave signals 24. The PWM comparator 16 receives the three phase difference voltages and outputs three phase switch signals to the inverter 18. According to the three phase switch signals, the inverter 18 outputs three phase input voltages to the motor 10 and controls the motor 10.

However, the conventional PI-PWM current control system 11 has the current phase-lag problem. Referring to FIGS. 2A, 2B, 3A, 3B and 3C, they show the comparison between the three phase actual currents and the three phase reference currents, according to the conventional PI-PWM current control system. FIG. 2A shows A phase reference current $I_{a1,\,refer}$. FIG. 2B shows A phase actual current $I_{a1,actual}$. FIG. 3A shows a comparison between A phase reference current $I_{a1,refer}$ and A phase actual current $I_{a1,actual}$. FIG. 3B shows a comparison between B phase reference current $I_{b1,refer}$ and B phase actual current $I_{b1,actual}$. FIG. 3C shows a comparison between C phase reference current $I_{c1,refer}$ and C phase actual current $I_{c1,actual}$. As shown in FIGS. 2A, 2B, 3A, 3B and 3C, the current phase-lag problem exists between the three phase reference currents $I_{a1,refer}$, $I_{b1,refer}$, $I_{c1,refer}$ and three phase actual currents $I_{a1,actual}$, $I_{b1,actual}$, $I_{c1,actual}$.

Besides, when a software is utilized to perform the operation of the PI controller 14, the conventional PI-PWM current control system 11 has the high noise problem. FIGS. 4A, 4B, 5A, 5B and 5C show the comparison between the three phase actual currents and the three phase reference currents, according to the conventional PI-PWM current control system 11 using a software to perform the PI controller 14. FIG. 4A shows A phase reference current $I_{a2,\,refer}$, FIG. 4B shows A phase actual current $I_{a2,actual}$, FIG. 5A shows a comparison between A phase reference current $I_{a2,refer}$ and A phase actual current $I_{a2,actual}$, FIG. 5B shows a comparison between B phase reference current $I_{b2,refer}$ and B phase actual current $I_{b2,actual}$, FIG. 5C shows a comparison between C phase reference current $I_{c2,refer}$ and C phase actual current $I_{c2,actual}$. As shown in FIGS. 4A, 4B, 5A, 5B and 5C, the three phase actual currents $I_{a1,actual}$, $I_{b1,actual}$, $I_{c1,actual}$ have the high noise problem.

Therefore, it is necessary to provide an innovative and progressive control method and system to solve the above problem.

SUMMARY OF THE INVENTION

One objective of the present invention is to provide a control method and system for a motor. The control method comprises the steps of: (a) determining a motor parameter; (b) providing a d-axis reference current and a q-axis reference current; (c) detecting actual currents of the motor and converting to a d-axis actual current and a q-axis actual current; (d) calculating a d-axis counter electromotive force and a q-axis counter electromotive force at a sample period according to the motor parameter, the d-axis actual current and the q-axis actual current at the sample period, the d-axis actual current and the q-axis actual current at a last sample period, and a d-axis voltage and a q-axis voltage at the last sample period; and (e) calculating a d-axis voltage and a q-axis voltage at the sample period according to the motor parameter, the d-axis actual current and the q-axis actual current at the sample period, the d-axis reference current and the q-axis reference current at a next sample period, the d-axis counter electromotive force and the q-axis counter electromotive force calculated at the sample period.

According to the control method of the invention, the d-axis voltage and the q-axis voltage are calculated and converted to three phase control voltages. The three phase control voltages are processed to control the motor. The control method of the invention not only preserves the merit of constant switching frequency of the conventional PI-PWM control system, but also can eliminate the motor current phase-lag problem of the conventional PI-PWM control system. Also the control method of the invention will have the following characteristics and economic advantages such as high accuracy, fast response, low cost and robustness etc.

DETAILED DESCRIPTION OF THE INVENTION

Figure 1:
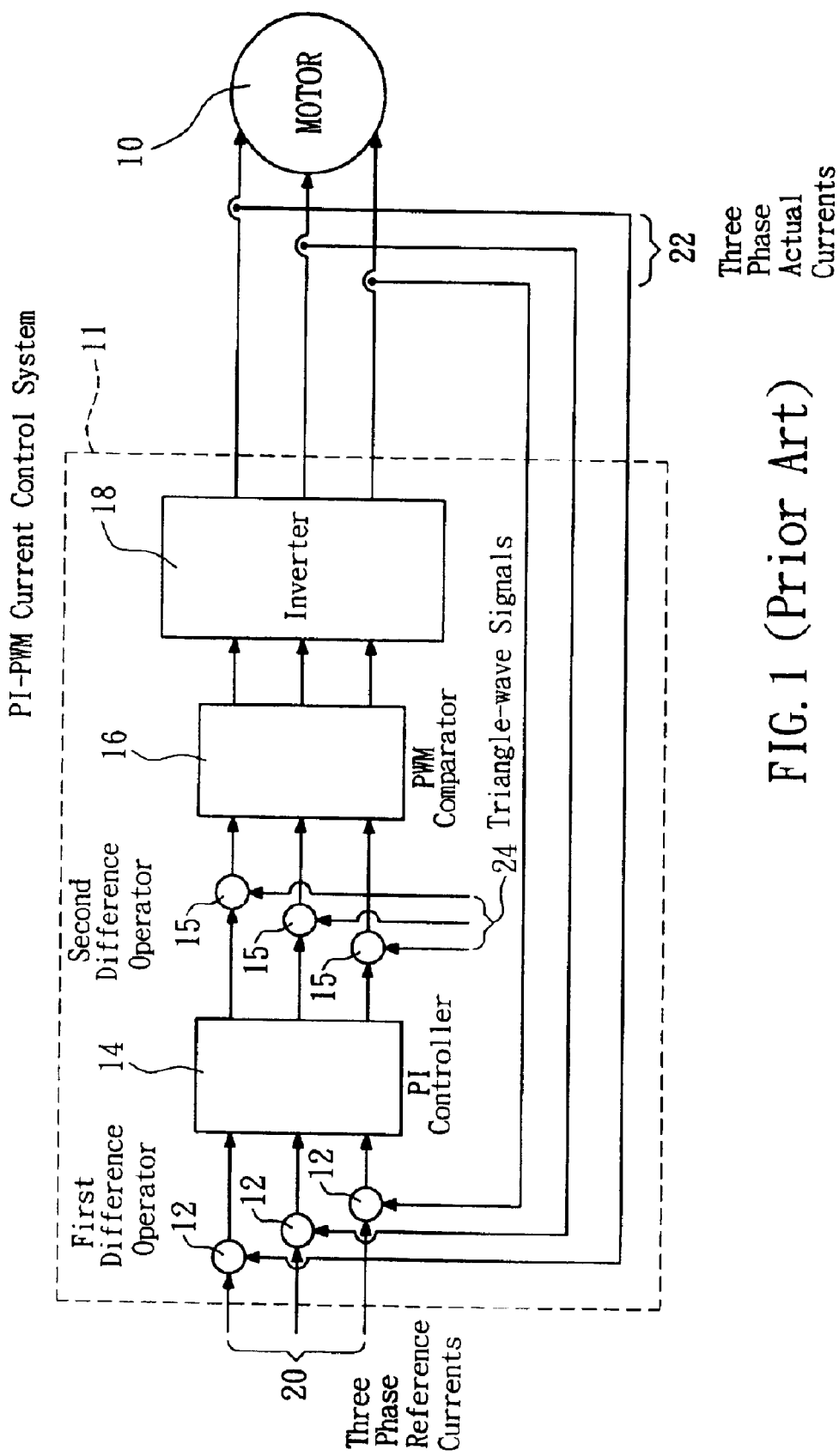
FIG. 1 shows a block diagram of a conventional PI-PWM current control system for a motor.
Figure 2A:
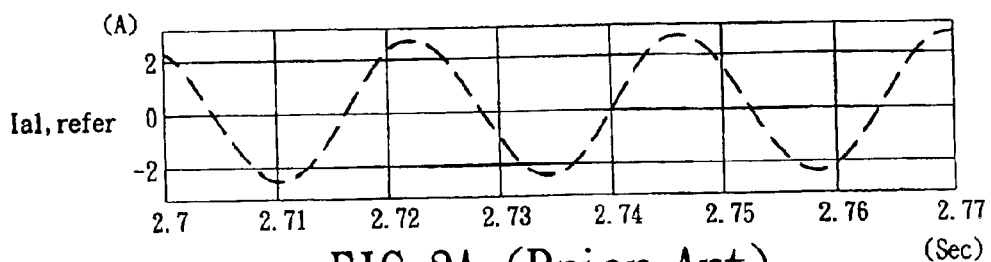
FIG. 2A shows A phase reference current $I_{a1,\,refer}$ waveform.
Figure 2B:
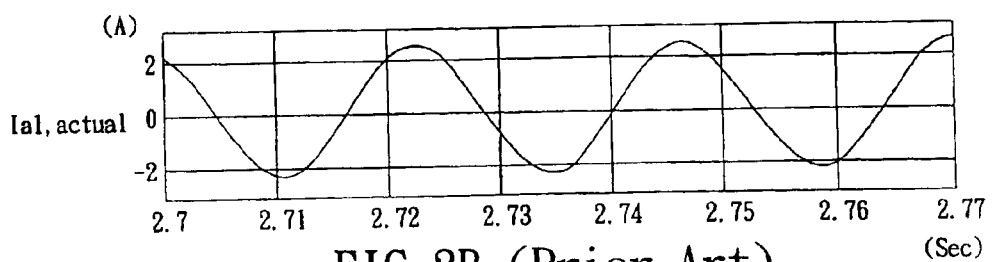
FIG. 2B shows A phase actual current $I_{a1,actual}$ waveform, according to the conventional PI-PWM current control system.
Figure 3A:
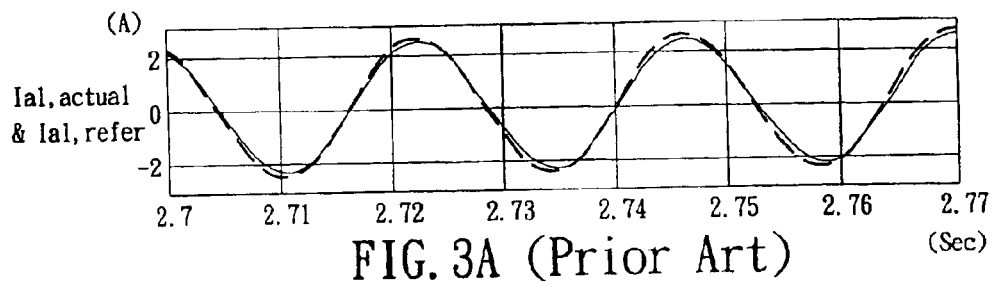
FIGS. 3A to 3C show comparison waveforms between the three phase reference currents and the three phase actual current, according to the conventional PI-PWM current control system.
Figure 3B:
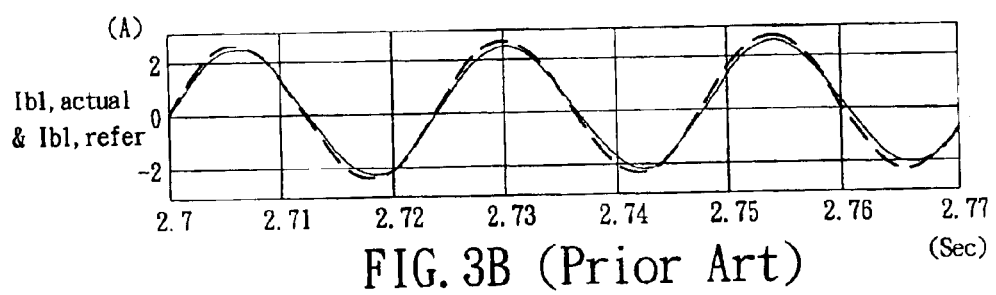
Figure 3C:
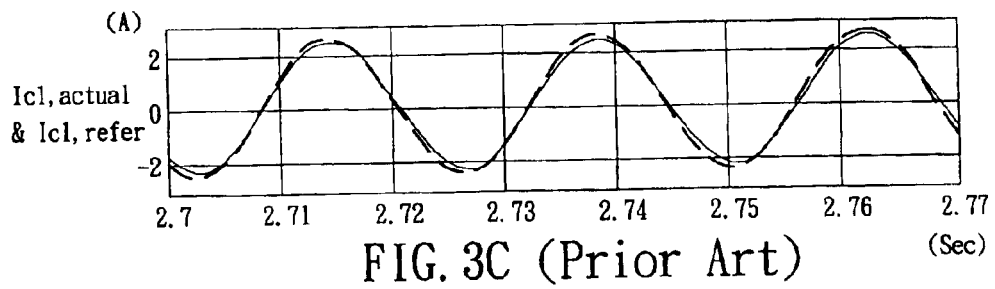
Figure 4A:
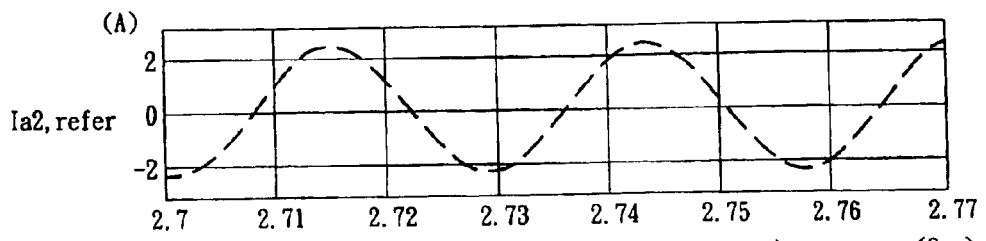
FIG. 4A shows A phase reference current $I_{a2,\,refer}$ waveform.
Figure 4B:
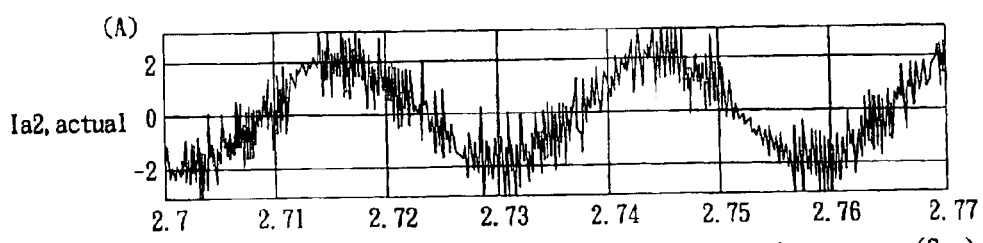
FIG. 4B shows A phase actual current $I_{a2,actual}$ waveform, according to the conventional PI-PWM current control system using a software to perform the operation of PI controller.
Figure 5A:
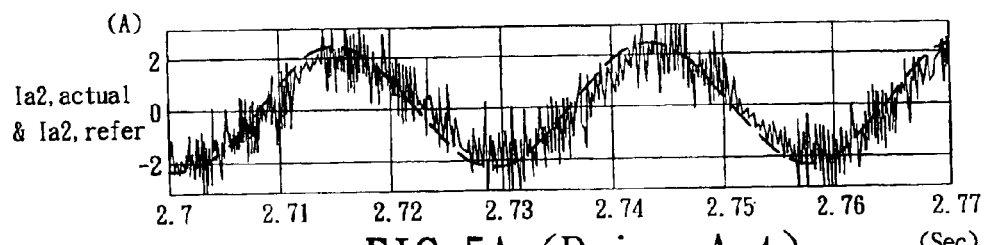
FIGS. 5A to 5C show comparison waveforms between the three phase reference currents and the three phase actual current, according to the conventional PI-PWM current control system using a software to perform the operation of PI controller.
Figure 5B:
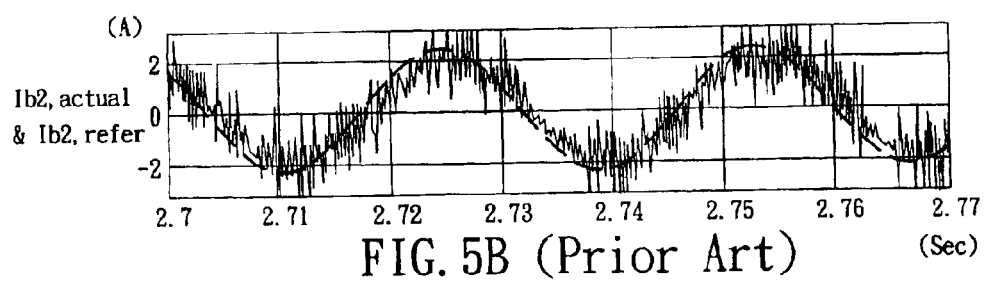
Figure 5C:
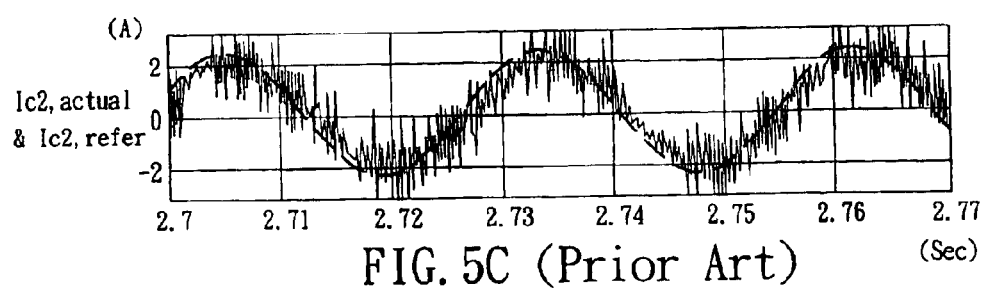

The control method of the invention can be utilized to control an AC motor, more particularly to control an induction motor so that three phase actual currents are equal to three phase reference currents. In the embodiment, the induction motor is taken as an example to describe the operation of the control method and system of the invention. However, the control method and system of the invention are not limited to control the induction motor, the other AC motor and DC motor can be controlled by the control method and system of the invention.

Firstly, the induction motor dynamic equations on the synchronous rotating d-q frame are shown as follows Equation (1).

$$\frac{d}{dt}\begin{bmatrix} i_{ds} \\ i_{qs} \\ \lambda_{dr} \\ \lambda_{qr} \end{bmatrix} = \begin{bmatrix} -\left(\frac{r_s}{L_\sigma} + \frac{r'_r \cdot L'^2_M}{L_\sigma \cdot L'^2_{rr}}\right) & \omega_e & \frac{r'_r \cdot L_M}{L_\sigma \cdot L'^2_{rr}} & \omega_r \frac{L_M}{L_\sigma L'_{rr}} \\ -\omega_e & -\left(\frac{r_s}{L_\sigma} + \frac{r'_r \cdot L'^2_M}{L_\sigma \cdot L'^2_{rr}}\right) & -\omega_r \frac{L_M}{L_\sigma \cdot L'_{rr}} & \frac{r'_r \cdot L_M}{L_\sigma L'^2_{rr}} \\ r'_r \frac{L_M}{L'_{rr}} & 0 & -\frac{r'_r}{L'_{rr}} & (\omega_e - \omega_r) \\ 0 & r'_r \frac{L_M}{L'_{rr}} & -(\omega_e - \omega_r) & -\frac{r'_r}{L'_{rr}} \end{bmatrix}$$

(1)

$$\begin{bmatrix} i_{ds} \\ i_{qs} \\ \lambda_{dr} \\ \lambda_{qr} \end{bmatrix} + \begin{bmatrix} \frac{1}{L_\sigma} & 0 \\ 0 & \frac{1}{L_\sigma} \\ 0 & 0 \\ 0 & 0 \end{bmatrix} \cdot \begin{bmatrix} V_{ds} \\ V_{qs} \end{bmatrix}$$

wherein $L_\sigma$ is defined as a leakage induction.

$$L_\sigma = \left(1 - \frac{L_M^2}{L_{ss}L_{rr}}\right)L_{ss} = \frac{L_{ss}L_{rr} - L_M^2}{L_{rr}} = \text{leakage inductance}$$

Equation (1) is re-arranged, and a d-axis voltage $V_{ds}$ and a q-axis voltage $V_{qs}$ are obtained as follows.

$$\begin{cases} V_{ds} = L_\sigma \frac{di_{ds}}{dt} - L_\sigma \omega_e i_{qs} - \omega_r \frac{L_M}{L'_{rr}} \lambda_{qr} + \left(r_s + r'_r \frac{L_M^2}{L'^2_{rr}}\right) \cdot i_{ds} - r'_r \frac{L_M}{L'^2_{rr}} \lambda_{dr} & (2) \\ V_{qs} = L_\sigma \frac{di_{qs}}{dt} - L_\sigma \omega_e i_{ds} + \omega_r \frac{L_M}{L'_{rr}} \lambda_{dr} + \left(r_s + r'_r \frac{L_M^2}{L'^2_{rr}}\right) \cdot i_{qs} - r'_r \frac{L_M}{L'^2_{rr}} \lambda_{qr} & (3) \end{cases}$$

A d-axis counter electromotive force $E_{ds}$ and a q-axis counter electromotive force $E_{qs}$ are defined as follows.

$$\begin{cases} E_{ds} = -\omega_r \frac{L_M}{L'_{rr}} \lambda_{qr} + \left(r_s + r'_r \frac{L_M^2}{L'^2_{rr}}\right) \cdot i_{ds} - r'_r \frac{L_M}{L'^2_{rr}} \lambda_{dr} & (4) \\ E_{qs} = +\omega_r \frac{L_M}{L'_{rr}} \lambda_{dr} + \left(r_s + r'_r \frac{L_M^2}{L'^2_{rr}}\right) \cdot i_{qs} - r'_r \frac{L_M}{L'^2_{rr}} \lambda_{qr} & (5) \end{cases}$$

Therefore, Equation (2) and (3) can be simplified as follows.

$$V_{ds} = L_\sigma \frac{di_{ds}}{dt} - L_\sigma \omega_e i_{qs} + E_{ds} \quad (6)$$

$$V_{qs} = L_\sigma \frac{di_{qs}}{dt} + L_\sigma \omega_e i_{ds} + E_{qs} \quad (7)$$

Wherein $di_{ds}/dt$ and $di_{qs}/dt$ can be calculated by a d-axis reference current $i_{ds,ref}$, a q-axis reference current $i_{qs,ref}$, a d-axis actual current $i_{ds,actual}$ and a q-axis actual current $i_{qs,actual}$ as follows.

$$\frac{di_{ds}}{dt} = \frac{i_{ds,ref}(t+T_s) - i_{ds,actual}(t)}{T_s} = \frac{i_{ds2,error}}{T_s} \quad (8)$$

$$\frac{di_{qs}}{dt} = \frac{i_{qs,ref}(t+T_s) - i_{qs,actual}(t)}{T_s} = \frac{i_{qs2,error}}{T_s} \quad (9)$$

Wherein $T_s$ is a sample time, and $T_s = 0.2$ ms. The $i_{ds,actual}(t)$ means a $i_{ds,actual}$ value at a sample period. The $i_{qs,actual}(t)$ means a $i_{qs,actual}$ value at a sample period. The $i_{ds, ref}(t+T_s)$ means a $i_{ds,ref}$ value at a next sample period. The $i_{qs,ref}(t+T_s)$ means a $i_{qs,ref}$ value at a next sample period. Therefore, $di_{ds}/dt$ and $di_{qs}/dt$ can be calculated easily by Equations (8) and (9).

The d-axis counter electromotive force $E_{ds}$ and the q-axis counter electromotive force $E_{qs}$ can be derived from Equations (6) and (7) as follows.

$$\begin{cases} E_{ds} = V_{ds} - L_\sigma \dfrac{di_{ds}}{dt} + L_\sigma \omega_e i_{qs} & (10) \\ E_{qs} = V_{qs} - L_\sigma \dfrac{di_{qs}}{dt} - L_\sigma \omega_e i_{ds} & (11) \end{cases}$$

Wherein $di_{ds}/dt$ and $di_{qs}/dt$ can be calculated by the d-axis actual current $i_{ds,\,actual}$ and the q-axis actual current $i_{qs,\,actual}$ as follows.

$$\begin{cases} \dfrac{di_{ds}}{dt} = \dfrac{i_{ds,actual}(t) - i_{ds,actual}(t-T_s)}{T_s} = \dfrac{i_{ds1,error}}{T_s} & (12) \\ \dfrac{di_{qs}}{dt} = \dfrac{i_{qs,actual}(t) - i_{qs,actual}(t-T_s)}{T_s} = \dfrac{i_{qs1,error}}{T_s} & (13) \end{cases}$$

Wherein $T_s$ is a sample time, and $T_s=0.2$ ms. The $i_{ds,actual}(t)$ means a $i_{ds,actual}$ value at a sample period. The $i_{qs,actual}(t)$ means a $i_{qs,actual}$ value at a sample period. The $i_{ds,\,actual}(t-T_s)$ means a $i_{ds,actual}$ value at a last sample period. The $i_{qs,actual}(t-T_s)$ means a $i_{qs,actual}$ value at a last sample period. Therefore, $di_{ds}/dt$ and $di_{qs}/dt$ in Equations (10) and (11) can be calculated easily by Equations (12) and (13).

Therefore, the d-axis voltage $V_{ds}$ and the q-axis voltage $V_{qs}$ can be calculated by Equations (6) to (13) according to the leakage inductance, the d-axis reference current $i_{ds,ref}$, the q-axis reference current $i_{qs,ref}$, the d-axis actual current $i_{ds,actual}$ and the q-axis actual current $i_{qs,actual}$.

Figure 6A:
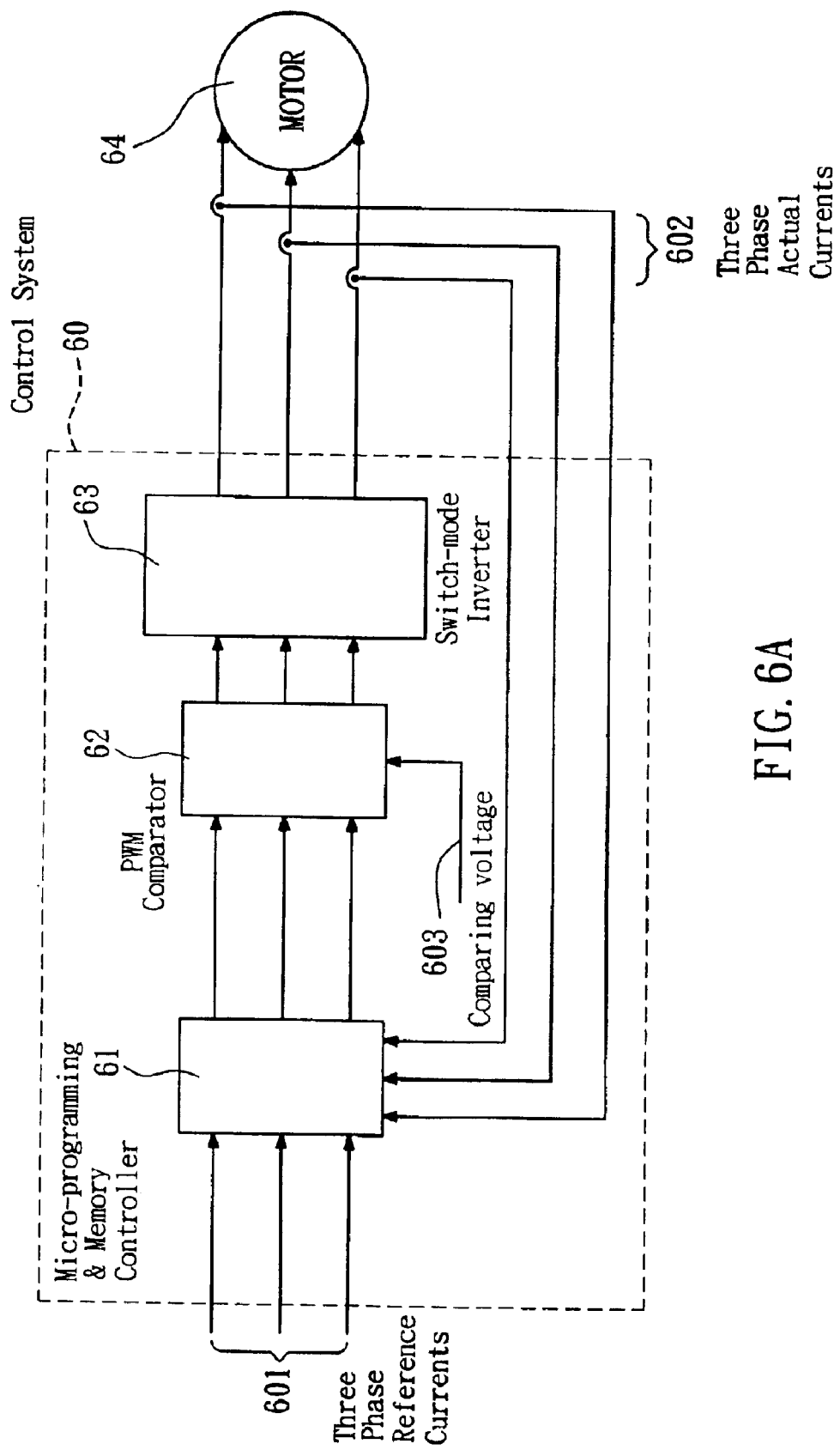
FIG. 6A shows a block diagram of a control system for a motor, according to the invention.
Figure 6B:
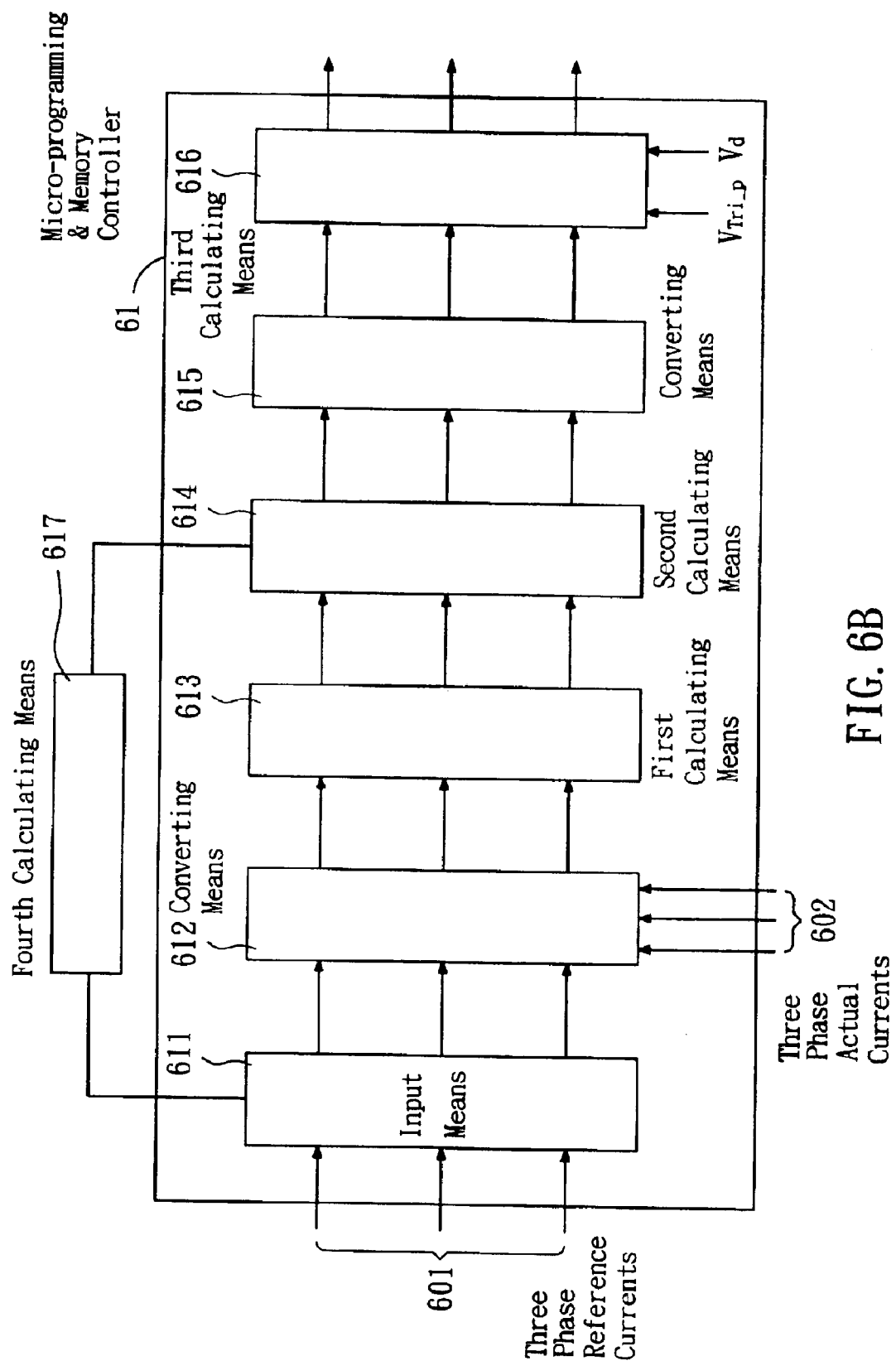
FIG. 6B shows a block diagram of a micro-programming & memory controller, according to the invention.
Figure 7:
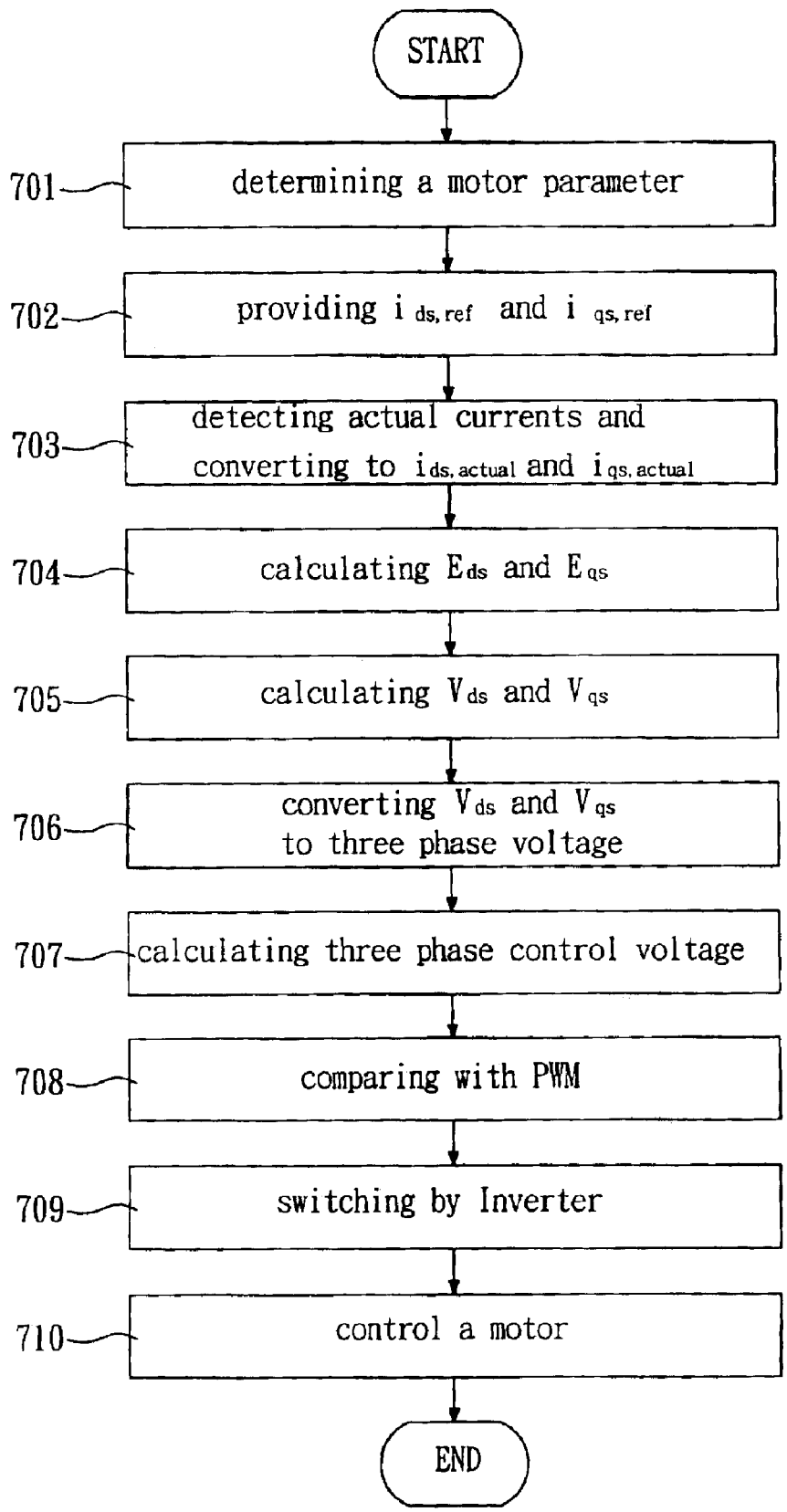
FIG. 7 shows a flow chart of a control method for a motor, according to the invention.

Referring to FIG. 6A, FIG. 6B and FIG. 7, the control system 60 comprises: a micro-programming & memory controller 61, a PWM comparator 62 and a switch-mode inverter 63. The micro-programming & memory controller 61 comprises: an input means 611, a detecting means 612, a first calculating means 613, a second calculating means 614, a converting means 615 and a third calculating means 616. The input means 611 is used for receiving a motor parameter, a d-axis reference current $i_{ds,ref}$ and a q-axis reference current $i_{qs,ref}$. The motor parameter can be a leakage inductance $L_\sigma$, and the expression is $$L_\sigma = \left(1 - \dfrac{L_M^2}{L_{ss}L_{rr}}\right)L_{ss} = \dfrac{L_{ss}L_{rr} - L_M^2}{L_{rr}}.$$

The leakage inductance $L_\sigma$ can be a constant. As shown in step 701 of FIG. 7, the motor parameter is determined.

The input means 611 can receive three phase reference currents 601, then the three phase reference current are converted to the d-axis reference current $i_{ds,ref}$ and the q-axis reference current $i_{qs,ref}$, as shown in step 702 of FIG. 7. Then, it is easy to obtained the d-axis reference current $i_{ds,ref}$ (t+$T_s$) and the q-axis reference current $i_{qs,ref}$ (t+$T_s$) at a next period in Equations (8) and (9).

The detecting means 612 is used for detecting three phase actual currents 602 from a motor 64 and converting the three phase actual currents to a d-axis actual current $i_{ds,actual}$ and a q-axis actual current $i_{qs,actual}$, as shown in step 703 of FIG. 7. At a sample time, the d-axis actual current $i_{ds,actual}$ (t) and the q-axis actual current $i_{qs,actual}$ (t) can be obtained in real-time, and at a last sample time (t-$T_s$) the values of the d-axis actual current $i_{ds,actual}$ (t-$T_s$) and the q-axis actual current $i_{qs,actual}$ (t-$T_s$) are stored in a memory.

Therefore, the $di_{ds}/dt$ and $di_{qs}/dt$ in Equations (12) and (13) can be calculated. The $i_{ds,actual}$ (t) is the $i_{ds,actual}$ value at a sample period, the $i_{qs,actual}$(t) is the $i_{qs,actual}$ value at a sample period, and the $i_{ds,actual}$ (t-$T_s$) is the stored $i_{ds,actual}$ value at a last sample period. The $i_{qs,actual}$ (t-$T_s$) is the stored $i_{qs,actual}$ value at a last sample period.

The first calculating means 613 is utilized to calculate a d-axis counter electromotive force $E_{ds}$ and a q-axis counter electromotive force $E_{qs}$ at a sample period according to the motor parameter $L_\sigma$, the d-axis actual current $i_{ds,actual}$(t) and the q-axis actual current $i_{qs,actual}$(t) at the sample period, the d-axis actual current $i_{ds,actual}$ (t-$T_s$) and the q-axis actual current $i_{qs,\,actual}$ (t-$T_s$) at a last sample period, and a d-axis voltage $V_{ds}$ and a q-axis voltage $V_{qs}$ at the last sample period. Therefore, the d-axis counter electromotive force $E_{ds}$ and the q-axis counter electromotive force $E_{qs}$ are calculated by Equations (10) and (11). The method for calculating the d-axis counter electromotive force $E_{ds}$ and the q-axis counter electromotive force $E_{qs}$ is shown in step 704 of FIG. 7.

The second calculating means 614 is used for calculating a d-axis voltage $V_{ds}$ and a q-axis voltage $V_{qs}$ at the sample period according to the motor parameter $L_\sigma$, the d-axis actual current $i_{ds,actual}$ (t) and the q-axis actual current $i_{qs,actual}$ (t) at the sample period, the d-axis reference current $i_{ds,ref}$ (t+$T_s$) and the q-axis reference current $i_{qs,ref}$ (t+$T_s$) at a next sample period, the d-axis counter electromotive force $E_{ds}$ and the q-axis counter electromotive force $E_{qs}$ at the sample period calculated by the first calculating means 612. Therefore, the d-axis voltage $V_{ds}$ and the q-axis voltage $V_{qs}$ are calculated by Equations (6) and (7). The method for calculating the d-axis voltage $V_{ds}$ and the q-axis voltage $V_{qs}$ is shown in step 705 of FIG. 7. The d-axis voltage $V_{ds}$ and the q-axis voltage $V_{qs}$ can be used to control the motor 64.

At the first sample period, the d-axis counter electromotive force $E_{ds}$ and the q-axis counter electromotive force $E_{qs}$ are equal to zero. Then, the d-axis voltage $V_{ds}$ and the q-axis voltage $V_{qs}$ can be calculated by Equations (6) and (7) at the first sample period using $E_{ds}=0$ and $E_{qs}=0$. At the second sample period, the d-axis counter electromotive force $E_{ds}$ and the q-axis counter electromotive force $E_{qs}$ can be calculated by Equations (10) and (11) using the d-axis voltage $V_{ds}$ and the q-axis voltage $V_{qs}$ at the first sample period. Then, the d-axis voltage $V_{ds}$ and the q-axis voltage $V_{qs}$ can be calculated by Equations (6) and (7) at the second sample period using the d-axis counter electromotive force $E_{ds}$ and the q-axis counter electromotive force $E_{qs}$ calculated at the second sample period. The above steps are repeated to calculate the d-axis voltage $V_{ds}$ and the q-axis voltage $V_{qs}$ every sample period so as to control the motor 64 of FIG. 6A.

The converting means 615 is used for converting the d-axis voltage $V_{ds}$ and the q-axis voltage $V_{qs}$ to three phase voltage $V_{as}, V_{bs}, V_{cs}$, as shown in step 706 of FIG. 7. The three phase voltage are converted by the third calculating means 616 to obtain three phase control voltage $V_{a,control}$, $V_{b,control}$ and $V_{c,control}$, as shown in step 707 of FIG. 7, according to the three phase voltages $V_{as}, V_{bs}, V_{cs}$, a peak voltage of a comparing voltage $V_{Tri\_p}$ and a DC voltage of the switch-mode inverter $V_d$ as follows.

$$\begin{cases} V_{a,control} = (V_{as} * V_{Tri\_P})/(1/2 * V_d) & (14) \\ V_{b,control} = (V_{bs} * V_{Tri\_P})/(1/2 * V_d) & (15) \\ V_{c,control} = (V_{cs} * V_{Tri\_P})/(1/2 * V_d) & (16) \end{cases}$$

The three phase control voltages are compared with a comparing voltage 603 by the PWM comparator 62, as shown in step 708 of FIG. 7. The comparing voltage 603 is a triangle wave voltage signal. After the PWM comparator 62, three phase switching signals are obtained to input and control the switch-mode inverter 63, as shown in step 709 of FIG. 7. The switch-mode inverter 63 outputs three phase input voltages to the motor 64, as shown in step 710 of FIG. 7.

Therefore, the three phase input voltages of motor can be calculated by the control method and the control system, according to the invention. The motor 64 can be controlled by the three phase input voltages so as to perform the objective of the three phase actual currents being equal to the three phase reference current.

Figure 8A:
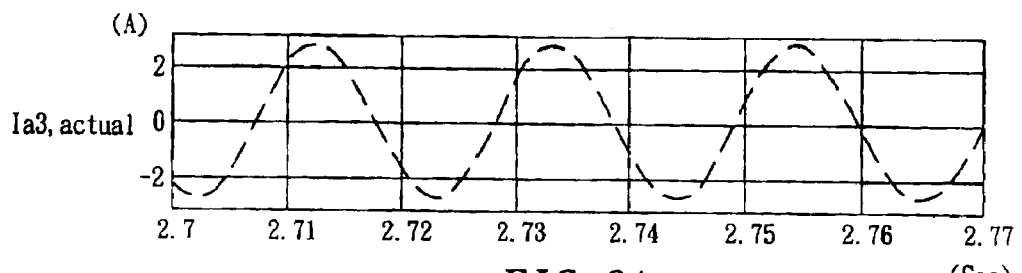
FIG. 8A shows A phase reference current $I_{a3,\,refer}$ waveform.
Figure 8B:
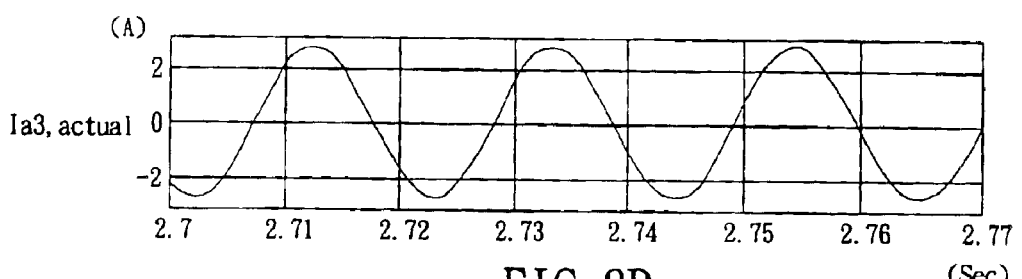
FIG. 8B shows A phase actual current $I_{a3,actual}$ waveform, according to the control system of the invention using a correct leakage inductance.
Figure 9A:
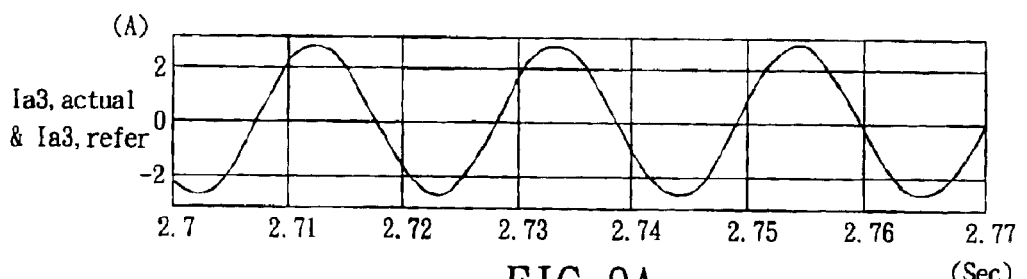
FIGS. 9A to 9C show comparison waveforms between the three phase reference currents and the three phase actual current, according to the control system of the invention using a correct leakage inductance.
Figure 9B:
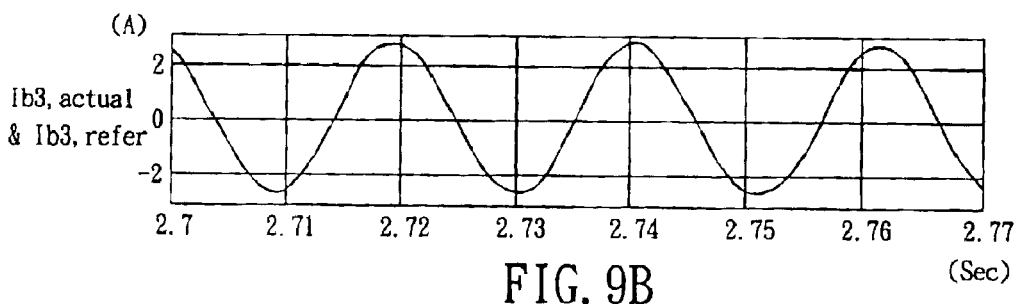
Figure 9C:
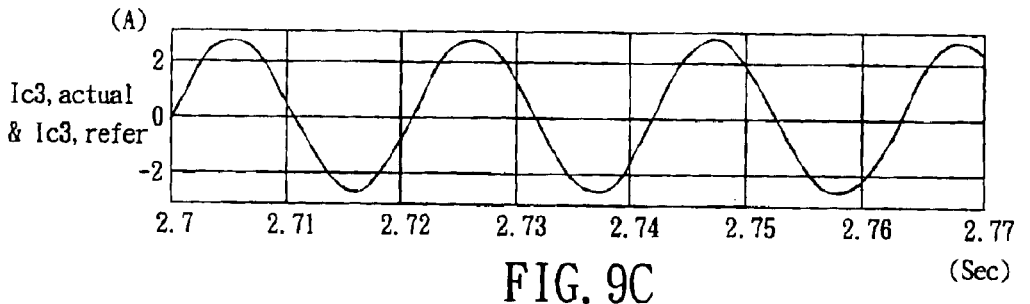

FIGS. 8A, 8B, 9A, 9B and 9C show the comparison between the three phase actual currents and the three phase reference currents, according to the control system 60 and the control method of the invention. FIG. 8A shows A phase reference current $I_{a3, refer}$, FIG. 8B shows A phase actual current $I_{a3,actual}$, FIG. 9A shows a comparison between A phase reference current $I_{a3,refer}$ and A phase actual current $I_{a3,actual}$, FIG. 9B shows a comparison between B phase reference current $I_{b3,refer}$ and B phase actual current $I_{b3,actual}$, and FIG. 9C shows a comparison between C phase reference current $I_{c3,refer}$ and C phase actual current $I_{c3,actual}$. FIGS. 8A, 8B, 9A, 9B and 9C are obtained by utilizing the Matlab software to perform the operation of the control system and using a correct leakage inductance. As shown in FIGS. 9A, 9B and 9C, the three phase actual currents $I_{a3,actual}$, $I_{b3,actual}$, $I_{c3,actual}$ are almost equal to the three phase reference currents $I_{a3,refer}$, $I_{b3,refer}$, $I_{c3,refer}$, respectively. Therefore, the control system can solve the current phase-lag problem in the conventional PI-PWM current control system.

To prove the robustness of the control system according to the invention, the Matlab software is also utilized to perform the operation of the control system using an excessive value of leakage induction and an inadequate value of leakage induction.

Figure 10A:
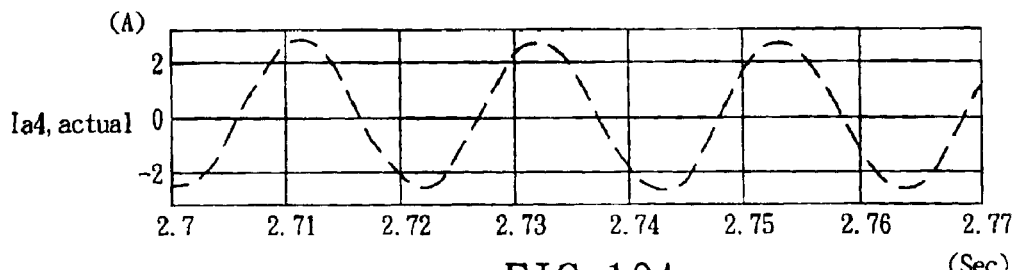
FIG. 10A shows A phase reference current $I_{a4, refer}$ waveform.
Figure 10B:
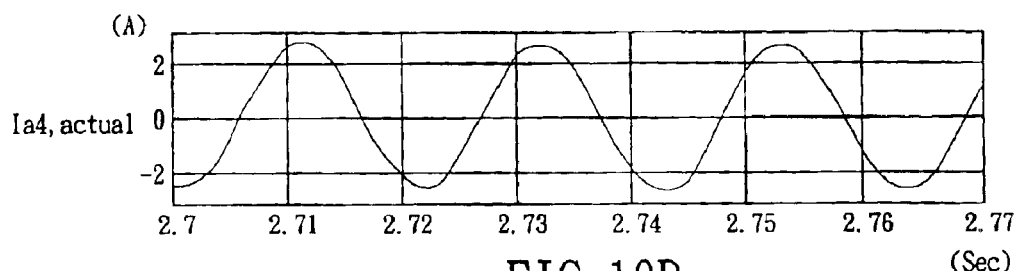
FIG. 10B shows A phase actual current $I_{a4, actual}$ waveform, according to the control system of the invention using an excessive leakage inductance.
Figure 11A:
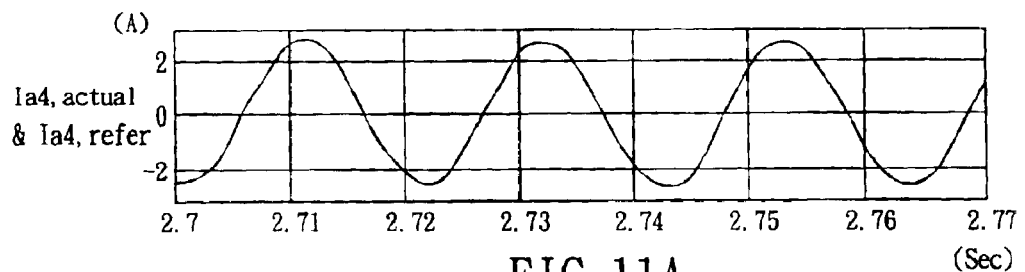
FIGS. 11A to 11C show comparison waveforms between the three phase reference currents and the three phase actual current, according to the control system of the invention using an excessive leakage inductance.
Figure 11B:
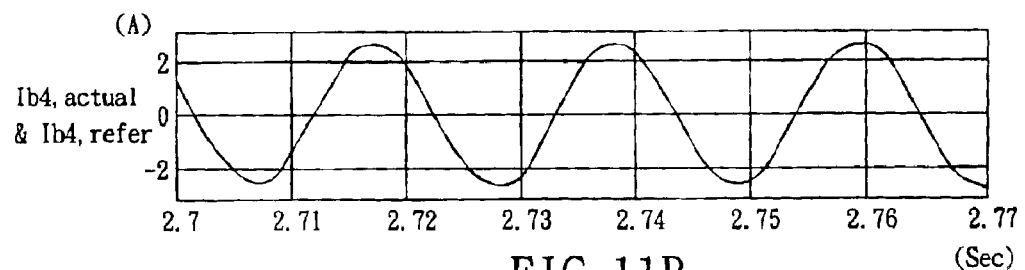
Figure 11C:
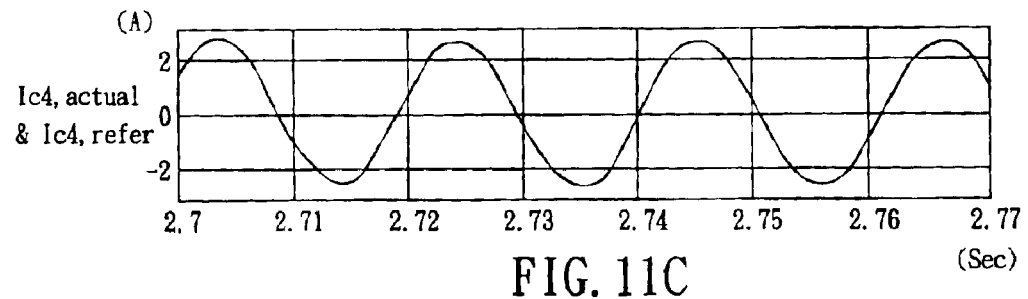

FIGS. 10A, 10B, 11A, 11B and 11C show the comparison between the three phase actual currents and the three phase reference currents, according to the control system 60 and the control method of the invention and using an excessive value of leakage induction 1.5 $L_\sigma$. FIG. 10A shows A phase reference current $I_{a4,refer}$, FIG. 10B shows A phase actual current $I_{a4,actual}$, FIG. 11A shows a comparison between A phase reference current $I_{a4,refer}$ and A phase actual current $I_{a4,actual}$, FIG. 11B shows a comparison between B phase reference current $I_{b4,refer}$ and B phase actual current $I_{b4,actual}$, and FIG. 11C shows a comparison between C phase reference current $I_{c4,refer}$ and C phase actual current $I_{c4,actual}$. As shown in FIGS. 11A, 11B and 11C, even using the excessive leakage induction 1.5 $L_\sigma$, three phase actual currents $I_{a4,actual}$, $I_{b4,actual}$, $I_{c4,actual}$ are still almost equal to the three phase reference currents $I_{a4,refer}$, $I_{b4,refer}$, $I_{c4,refer}$, respectively.

Figure 12A:
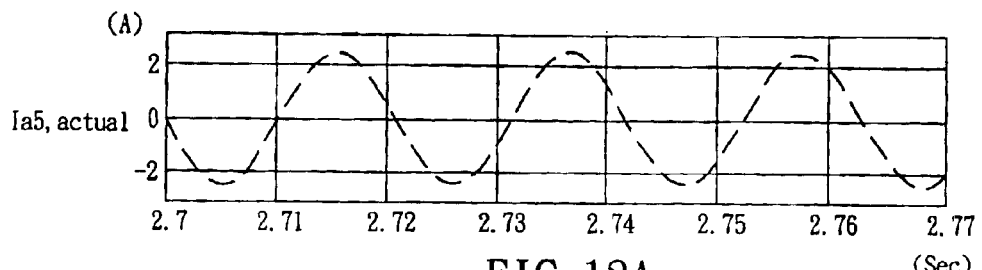
FIG. 12A shows A phase reference current $I_{a5, refer}$ waveform.
Figure 12B:
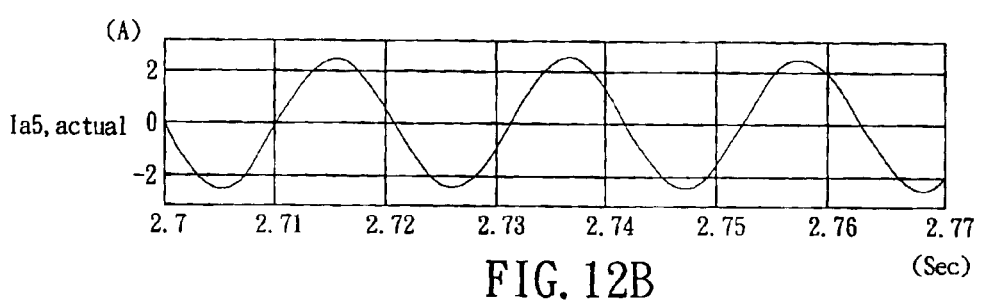
FIG. 12B shows A phase actual current $I_{a5, actual}$ waveform, according to the control system of the invention using an inadequate leakage inductance.
Figure 13A:
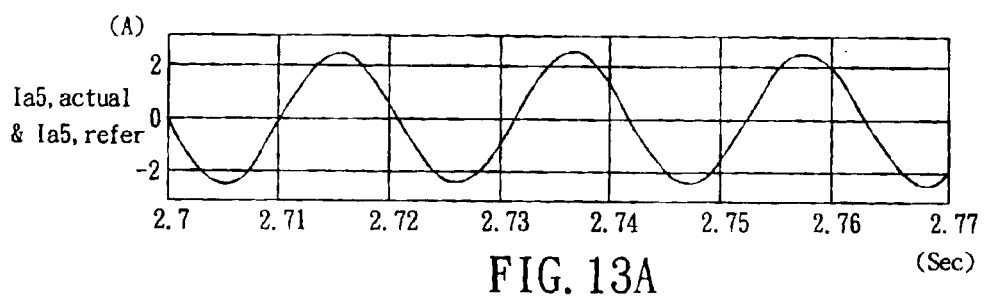
FIGS. 13A to 13C show comparison waveforms between the three phase reference currents and the three phase actual current, according to the control system of the invention using an inadequate leakage inductance.
Figure 13B:
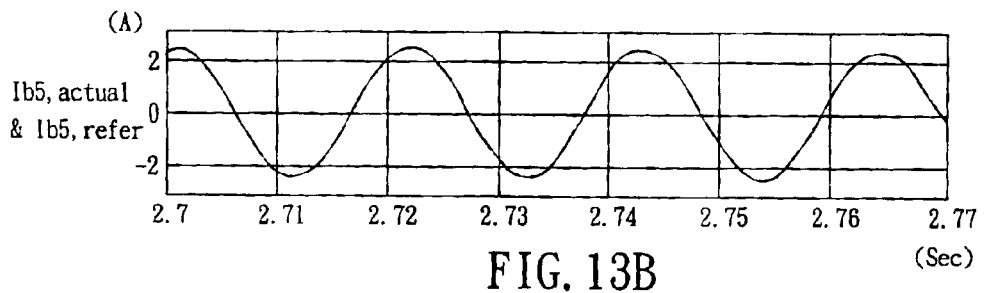
Figure 13C:
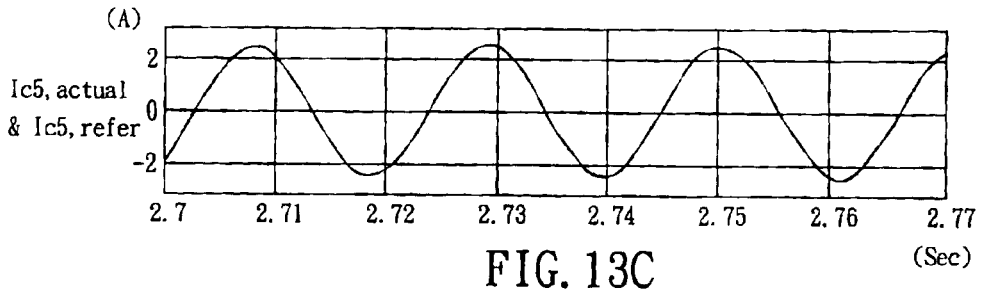

FIGS. 12A, 12B, 13A, 13B and 13C show the comparison between the three phase actual currents and the three phase reference currents, according to the control system 60 and the control method of the invention and using an inadequate value of leakage induction 0.5 $L_\sigma$. FIG. 12A shows A phase reference current $I_{a5,refer}$, FIG. 12B shows A phase actual current $I_{a5,actual}$, FIG. 13A shows a comparison between A phase reference current $I_{a5,refer}$ and A phase actual current $I_{a5,actual}$, FIG. 13B shows a comparison between B phase reference current $I_{b5,refer}$ and B phase actual current $I_{b5,actual}$, and FIG. 13C shows a comparison between C phase reference current $I_{c5,refer}$ and C phase actual current $I_{c5,actual}$. As shown in FIGS. 13A, 13B and 13C, even using the inadequate leakage induction 0.5 $L_\sigma$, three phase actual currents $I_{a5,actual}$, $I_{b5,actual}$, $I_{c5,actual}$ are still almost equal to the three phase reference currents $I_{a5,refer}$, $I_{b5,refer}$, $I_{c5,refer}$, respectively.

Therefore, as shown in FIG. 8A to FIG. 13C, within ±50% error of the leakage inductance $L_\sigma$, the three phase actual currents can be almost equal to the three phase reference currents. The control method of the invention not only preserves the merit of constant switching frequency of the conventional PI-PWM control system, but also can eliminate the motor current phase-lag problem of the conventional PI-PWM control system. Also, the control method of the invention will have the following characteristics and economic advantages such as high accuracy, fast response, low cost and robustness etc.

In the above embodiments, the leakage inductance $L_\sigma$ is the only variable. The leakage inductance $L_\sigma$ is determined usually by the parameter test of the motor. If the parameter test is not correct, the value of the leakage inductance $L_\sigma$ may be above the correct value in the error ±50%. If the incorrect leakage inductance $L_\sigma$ with above ±50% error is utilized to calculate the d-axis voltage $V_{ds}$ and the q-axis voltage $V_{qs}$, the three phase actual currents may be not equal to the three phase reference currents. Therefore, the leakage inductance $L_\sigma$ must be real-time auto-tuning as follows.

At a sample period, Equations (6) and (7) are modified as follows.

$$V_{ds1} = L_\sigma \frac{di_{ds1}}{dt} - L_\sigma \omega_e i_{qs1} + E_{ds1} = m_{d1} L_\sigma + E_{ds1} \tag{17}$$

$$V_{qs1} = L_\sigma \frac{di_{qs1}}{dt} + L_\sigma \omega_e i_{ds1} + E_{qs1} = m_{q1} L_\sigma + E_{qs1} \tag{18}$$

Wherein in Equations (17) and (18) the variables are the leakage inductance $L_\sigma$, $E_{ds1}$, and $E_{qs1}$, the $m_{d1}$ and $m_{q1}$ are defined and obtained as follows $$m_{d1} = \left(\frac{di_{ds1}}{dt} - \omega_e i_{qs1}\right) \cdot m_{q1} = \left(\frac{di_{qs1}}{dt} + \omega_e i_{ds1}\right).$$

At a next sample period, Equations (6) and (7) are modified as follows.

$$V_{ds2} = L_\sigma \frac{di_{ds2}}{dt} - L_\sigma \omega_e i_{qs2} + E_{ds2} = m_{d2} L_\sigma + E_{ds2} \tag{19}$$

$$V_{qs2} = L_\sigma \frac{di_{qs2}}{dt} + L_\sigma \omega_e i_{ds2} + E_{qs2} = m_{q2} L_\sigma + E_{qs2} \tag{20}$$

Wherein in Equations (19) and (20) the variables are the leakage inductance $L_\sigma$, $E_{ds2}$ and $E_{qs2}$, the $m_{d2}$ and $M_{q2}$ are defined and obtained as follows $$m_{d2} = \left(\frac{di_{ds2}}{dt} - \omega_e i_{qs2}\right) \cdot m_{q2} = \left(\frac{di_{qs2}}{dt} + \omega_e i_{ds2}\right).$$

Equation (19) minus Equation (17) is as follows.

$$(V_{ds2}-V_{ds1})=(m_{d2}-m_{d1})L_\sigma+(E_{ds2}-E_{ds1})\approx(m_{d2}-m_{d1})L_\sigma \tag{21}$$

In Equation (21), because the sample time is very small, the difference between the $E_{ds2}$ and $E_{ds1}$ can be ignored so that $E_{ds2} \approx E_{sd1}$. Therefore, the leakage inductance $L_{\sigma,d}$ is estimated using d-axis Equations (17) and (19). The expression of the leakage inductance $L_{\sigma,d}$ is as follows.

$$L_{\sigma,d}=(V_{ds2}-V_{ds1})/(m_{d2}-m_{d1}) \tag{22}$$

Similarly, Equation (20) minus Equation (18), and the difference between the $E_{qs2}$ and $E_{qs1}$ can be ignored. The leakage inductance $L_{\sigma,q}$ is estimated using q-axis Equations (18) and (20). The expression of the leakage inductance $L_{\sigma,q}$ is as follows.

$$L_{\sigma,q}=(V_{qs2}-V_{qs1})/(m_{q2}-m_{q1}) \tag{23}$$

Therefore, the leakage inductance $L_o$ is defined as an average of the leakage inductance $L_{o,d}$ and the leakage inductance $L_{o,q}$ as follows.

$$L_o = 0.5*(L_{o,d} + L_{o,q}) \quad (24)$$

The leakage inductance $L_o$ is calculated by the above Equations (17) to (24). The calculated leakage inductance $L_o$ is inputted to Equations (6), (7), (10) and (11) to calculate $V_{ds}$, $V_{qs}$, $E_{ds}$ and $E_{qs}$ for two sample periods as $V_{ds1}$, $V_{qs1}$, $V_{ds2}$ and $V_{qs2}$. Therefore, the value of $V_{ds1}$, $V_{qs1}$, $V_{ds2}$ and $V_{qs2}$ in Equations (17), (18), (19) and (20) can be obtained to calculated a new leakage inductance $L_o$. Every two sample periods, the leakage inductance $L_o$ is calculated and updated to input to Equations (6), (7), (10) and (11) to calculate $V_{ds}$, $V_{qs}$, $E_{ds}$ and $E_{qs}$. Therefore, Equations (17) to (24) is calculated every two sample periods to obtained a new leakage inductance L, so that the leakage inductance $L_o$ can approach to the correct value.

Figure 14A:
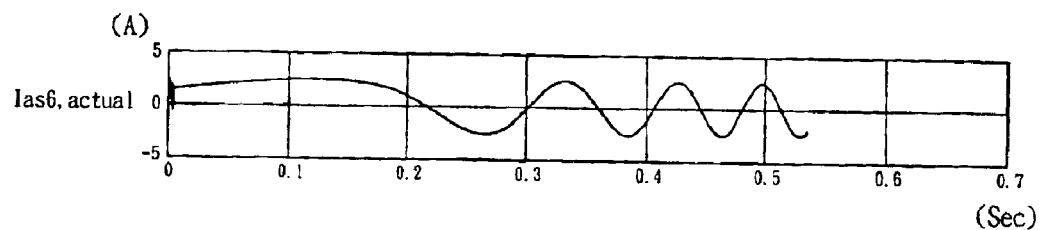
FIGS. 14A to 14C show three phase actual currents, according to the control system of the invention using a software to tune the leakage inductance.
Figure 14B:
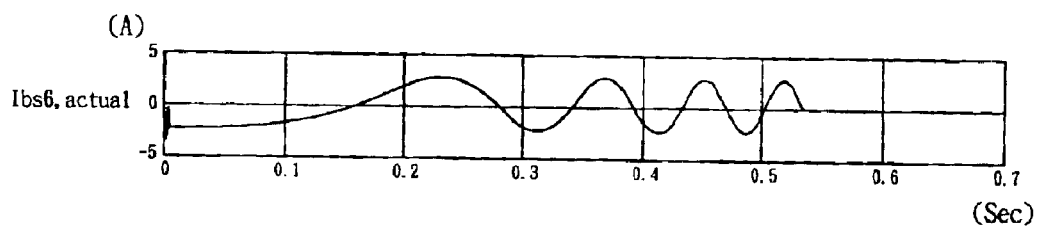
Figure 14C:
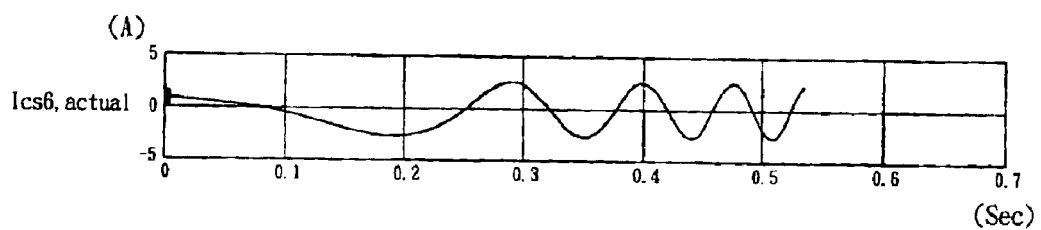
Figure 14D:
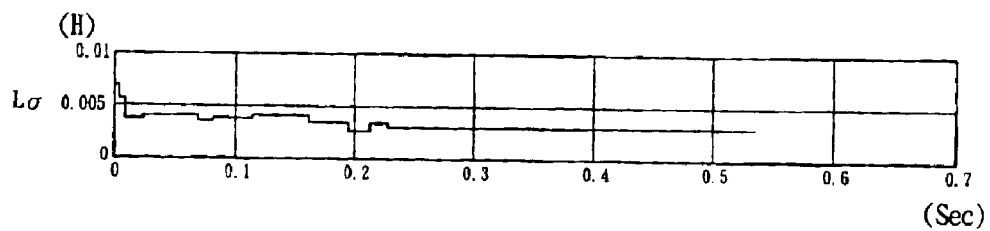
FIG. 14D shows the change of the leakage inductance, according to the control system of the invention using a software to tune the leakage inductance.

Referring to FIG. 14A to FIG. 14D, it shows a simulation using the Matlab software. As shown in FIG. 14D, the leakage inductance $L_o$ can approach to the correct value and be stable within 0.25 second.

Referring to FIG. 6B, the micro-programming & memory controller 61 further comprises an fourth calculating means 617 for estimating the leakage inductance $L_o$ according to the above method. Therefore, by using the estimation of the leakage inductance $L_o$ the control system 60 can improve the robustness.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A control method for a motor, comprising the steps of:
   (a) determining a motor parameter;
   (b) providing a d-axis reference current and a q-axis reference current;
   (c) detecting actual currents of the motor and converting them into a d-axis actual current and a q-axis actual current;
   (d) calculating a d-axis counter electromotive force and a q-axis counter electromotive force at a sample period according to the motor parameter, the d-axis actual current and the q-axis actual current at the sample period, the d-axis actual current and the q-axis actual current at a last sample period, and a d-axis voltage and a q-axis voltage at the last sample period; and
   (e) calculating a d-axis voltage and a q-axis voltage at the sample period according to the motor parameter, the d-axis actual current and the q-axis actual current at the sample period, the d-axis reference current and the q-axis reference current at a next sample period, the d-axis counter electromotive force and the q-axis counter electromotive force at the sample period.

2. The control method according to claim 1, wherein in the step (d) the d-axis counter electromotive force and the q-axis counter electromotive force are equal to zero at a first ample period.

3. The control method according to claim 1, further comprising a step (f) for converting the d-axis voltage and the q-axis voltage into three phase voltages.

4. The control method according to claim 3, further comprising a step (g) for calculating three phase control voltages according to the three phase voltages, a peak value of a comparing voltage and a DC voltage.

5. The control method according to claim 4, further comprising a step (h) for comparing the three phase control voltages and a comparing voltage of a PWM comparator to control a switch-mode inverter and to obtain three phase input voltage for controlling the motor.

6. The control method according to claim 5, further a repeat step for repeating the step (c) to the step (h) to calculate the three phase input voltages during all period for controlling the motor.

7. The control method according to claim 1, in the step (a) wherein the motor parameter is a leakage inductance.

8. The control method according to claim 7, wherein the leakage inductance is a constant.

9. The control method according to claim 7, wherein the leakage inductance is determined according to the d-axis voltage and the q-axis voltage at the last sample period and a last two sample period, the d-axis actual current and the q-axis actual current at the sample period, the last sample period and a last two sample period.

10. A control system for a motor comprising:
   an input means for receiving a motor parameter, a d-axis reference current and a q-axis reference current;
   a detecting means for detecting actual currents of the motor and converting the three phase currents to a d-axis actual current and a q-axis actual current;
   a first calculating means for calculating a d-axis counter electromotive force and a q-axis counter electromotive force at a sample period according to the motor parameter, the d-axis actual current and the q-axis actual current at the sample period, the d-axis actual current and the q-axis actual current at a last sample period, and a d-axis voltage and a q-axis voltage at the last sample period; and
   a second calculating means for calculating a d-axis voltage and a q-axis voltage at the sample period according to the motor parameter, the d-axis actual current and the q-axis actual current at the sample period, the d-axis reference current and the q-axis reference current at a next sample period, the d-axis counter electromotive force and the q-axis counter electromotive force at the sample period.

11. The control system according to claim 10, further comprising a converting means for converting the d-axis voltage and the q-axis voltage into three phase voltages.

12. The control system according to claim 11, further comprising a third calculating means for calculating three phase control voltages according to the three phase voltages, a peak value of a comparing voltage and a DC voltage.

13. The control system according to claim 12, further comprising a PWM comparator for comparing the three phase control voltages and a comparing voltage.

14. The control system according to claim 13, further comprising a switch-mode inverter for outputting three phase input voltage to the motor according to three phase switching signals from the PWM comparator.

15. The control method according to claim 10, wherein the motor parameter is a leakage inductance.

16. The control system according to claim 15, further comprising a fourth calculating means for calculating the leakage inductance according to the d-axis voltage and the q-axis voltage at the last sample period and a last two sample period, the d-axis actual current and the q-axis actual current at the sample period, the last sample period and a last two sample period.

* * * * *